United States Patent [19]

Suzuki

[11] Patent Number: 5,880,476

[45] Date of Patent: Mar. 9, 1999

[54] RADIATION IMAGE STORAGE PANEL AND RADIATION IMAGE READING METHOD

[75] Inventor: Hideki Suzuki, Kanagawa, Japan

[73] Assignee: Fuji Photo Film Co., Ltd., Kanagawa, Japan

[21] Appl. No.: 861,810

[22] Filed: May 22, 1997

[30] Foreign Application Priority Data

May 23, 1996 [JP] Japan .................................. 8-153224

[51] Int. Cl.⁶ .............................. G21K 4/00; G03B 42/02
[52] U.S. Cl. ....................... 250/484.4; 250/584; 250/588
[58] Field of Search .................................. 250/584, 585, 250/588, 589, 484.4

[56] References Cited

U.S. PATENT DOCUMENTS

| | | |
|---|---|---|
| 4,501,683 | 2/1985 | Arakawa et al. ............... 250/484.4 X |
| 5,023,461 | 6/1991 | Nakazawa et al. ............... 250/484.4 |
| 5,483,801 | 1/1996 | Hosoi ............................. 250/484.4 X |
| 5,534,710 | 7/1996 | Suzuki ................................. 250/588 |

FOREIGN PATENT DOCUMENTS 102010  3/1984  European Pat. Off. ............ 250/484.4

Primary Examiner—Edward J. Glick
Attorney, Agent, or Firm—Birch, Stewart, Kolasch & Birch, LLP

[57] ABSTRACT

A radiation image storage panel composed of a support sheet and a stimulable phosphor layer, in which the support sheet shows a light transmittance of not less than 70% in the wavelength region between 400 nm and 800 nm and a haze of 10 to 30 is favorably employed in a radiation image reading system employing a double-side reading system in which a stimulating step and an erasing step are simultaneously performed in parallel on the same storage panel.

5 Claims, 4 Drawing Sheets

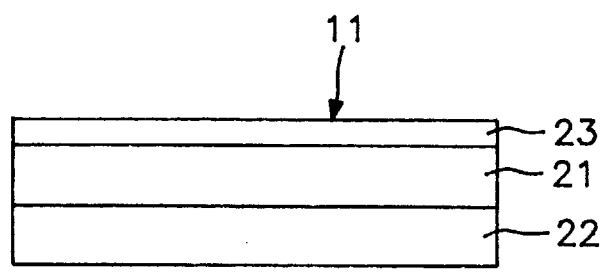
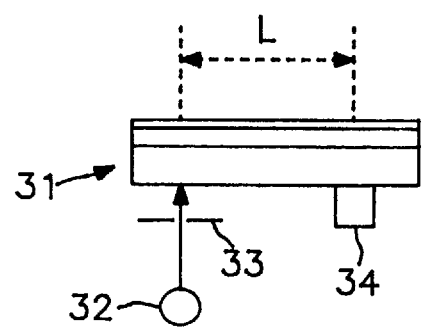

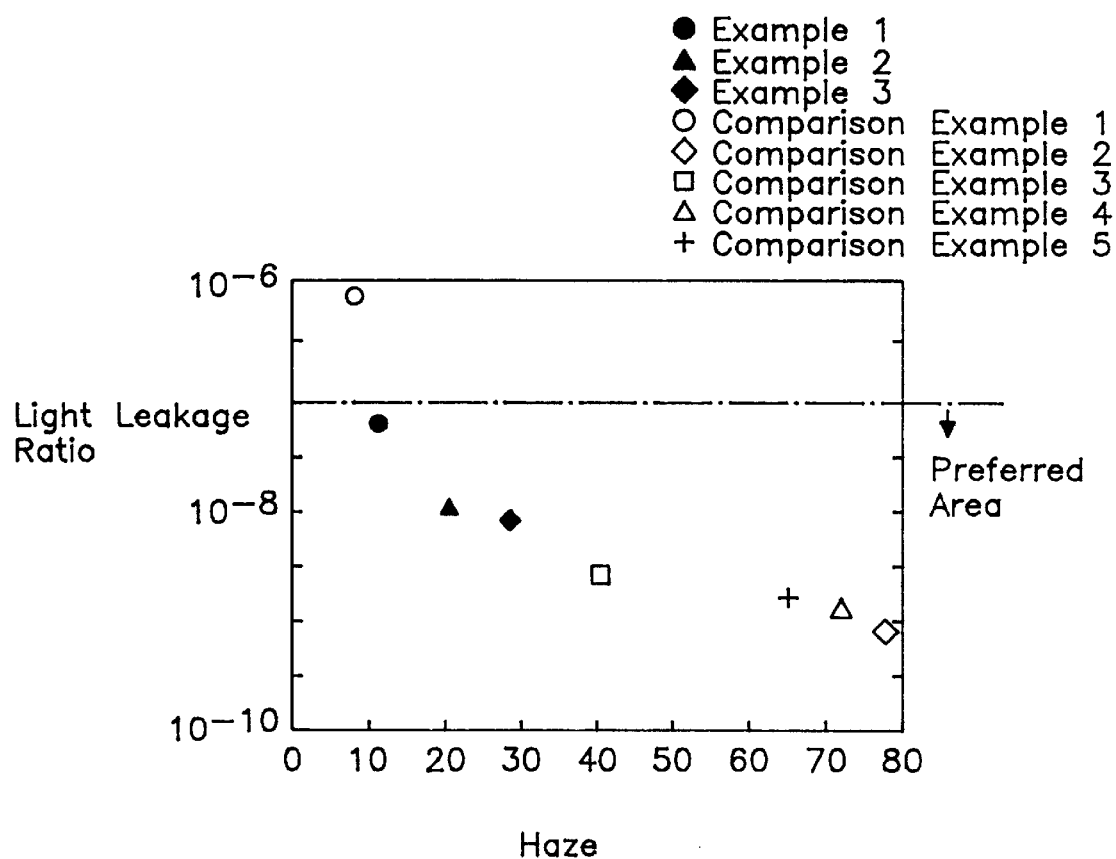

RADIATION IMAGE STORAGE PANEL AND RADIATION IMAGE READING METHOD

FIELD OF THE INVENTION

The present invention relates to a radiation image storage panel utilizing a stimulable phosphor and a radiation image recording and reproducing method employing the radiation image storage panel. The invention is specifically directed to a radiation image recording and reproducing method which comprises the successive steps of detecting the emission produced by the stimulable phosphor of the radiation image storage panel on both sides of the storage panel and thereafter erasing a radiation image remaining in the storage panel.

BACKGROUND OF THE INVENTION

A radiation image recording and reproducing method utilizing a stimulable phosphor described, for instance, in U.S. Pat. No. 4,239,968, is now practically employed. In the method, a radiation image storage panel comprising a stimulable phosphor (i.e., stimulable phosphor sheet) is employed, and the method comprises the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (i.e., stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying radiation to the object at a considerably smaller dose, as compared with a conventional radiography using a combination of radiographic film and radiographic intensifying screen. Further, the radiation image recording and reproducing method using a stimulable phosphor is of great value especially when the method is employed for medical diagnosis.

The radiation image storage panel employed in the above-described method comprises a stimulable phosphor layer which is optionally provided on a support. Further, a transparent layer of a polymer material is generally provided on the free surface (e.g., surface not facing the support) of the phosphor layer to keep the phosphor layer from chemical deterioration or physical shock.

The stimulable phosphor layer generally comprises a binder and a stimulable phosphor (in the form of particles). The stimulable phosphor emits light (that is, gives stimulated emission) when it is excited with an electromagnetic wave (i.e., stimulating rays) after it is exposed to radiation such as X-rays. In more detail, the radiation having passed through an object or radiated from an object is absorbed by the stimulable phosphor layer of the panel in an amount proportional to the applied radiation dose, and a radiation image of the object is formed on the panel in the form of a radiation energy-stored image. The radiation energy-stored image can be released as stimulated emission by sequentially irradiating the storage panel with stimulating rays. The stimulated emission is then photoelectrically detected to give a series of electric signals, so as to reproduce a visible image from the electric signals.

In the radiation image recording and reproducing method, radiation image storage panels of other types such as those having a vacuum-deposited or sintered stimulable phosphor layer may be employed.

The radiation image recording and reproducing method is generally performed in a united radiation image recording and reading apparatus which comprises recording means (for applying a radiation having an image information to the radiation image storage panel to record the radiation image on the storage panel); reading means (for irradiating the stimulating rays to the storage panel having the radiation image to produce stimulated emission from the storage panel and photoelectrically reading the stimulated emission); erasing means (for applying an erasing light to the storage panel after the reading step is complete to remove a radiation image remaining in the storage panel); and transfer system (which is arranged between these means, for transferring the storage panel from one means to another means in predetermined order). Alternatively, the radiation image recording and reading apparatus may comprise two separated apparatuses, that is, a radiation image recording apparatus and a radiation image reading apparatus equipped with erasing means.

In any of the radiation image recording and reproducing systems, the radiation image storage panel is repeatedly employed after the remaining radiation image is erased.

In the radiation image recording and reproducing method, the radiation image recorded in the storage panel is generally read by applying the stimulating rays to one side of the storage panel and collecting light emitted by the phosphor particles by means of a light-collecting means from the same side (hereinafter referred to as "single-side reading system"). There is a case, however, that the light emitted by the phosphor particles should be collected on both sides of the storage panel. This is because the emitted light is desired to be collected as much as possible. There also is a case that the radiation image recorded in the phosphor layer varies along the depth direction of the layer and such variation of the radiation image should be detected. An example of the system for reading the radiation image from both sides (hereinafter referred to as "double-side reading system") is illustrated in FIG. 1 of the attached drawings.

In FIG. 1, the radiation image storage panel 11 is transferred (or moved) by a combination of two sets of nip rolls 12a, 12b. The stimulating rays such as laser beam 13 is applied to the storage panel 11 on one side, and the light emitted by the phosphor particles advances upward and downward (in other words, toward both the upper and lower surfaces). The downward light 14a is collected by a light collector 15a (arranged on the lower side), converted into an electric signal in a photoelectric conversion device (e.g., photomultiplier) 16a, multiplied in a multiplier 17a, and then sent to a signal processor 18. On the other hand, the upward light 14b is directly, or after reflection on a mirror 19, collected by a light collector 15b (arranged on the upper side), converted into an electric signal in a photoelectric conversion device (e.g., photomultiplier) 16b, multiplied in a multiplier 17b, and then sent to the signal processor 18. In the signal processor 18, the electric signals sent from the multipliers 17a, 17b are processed in a predetermined manner such as addition processing or reduction processing depending upon characteristics of the desired radiation image.

The radiation image storage panel 11 continuously advances in the direction indicated by the allow by means of the nip rolls 12a, 12b. Accordingly, the area of the storage panel which is subjected to the stimulating step (i.e., reading step) is subjected to an erasing step which uses an erasing lamp 20 such as a sodium lamp. In the erasing step, the radiation energy which still remains in the storage panel after being subjected to the reading step is almost completely released from the storage panel. Therefore, the radiation image storage panel having been subjected to the erasing step contains almost no latent image composed of the remaining radiation energy, and is favorably employed in the next cycle of the radiation image recording and reproducing method.

According to studies of the present invention on the radiation image reading system illustrated in FIG. 1 which comprises the successive stimulating and erasing steps applied in parallel on the same storage panel, it has been noted that the radiation image in that system sometimes suffers from noise. Therefore, the inventor has further studied the reason of noise observed in the reproduced radiation image, and discovered that the noise is produced by a portion of the erasing light which is applied on the adjacent area of the storage panel and then moves in a zig-zag mode in the horizontal direction within the transparent support of the storage panel along its plane to reach the area which is under stimulation.

The troublesome noise can be removed by not performing the reading step and the erasing step on the storage panel in parallel. However, the procedures of the combined reading and erasing step in parallel are very advantageous from the viewpoint of performing the radiation image recording and reproducing method quickly and efficiently. Such system is also advantageous because the whole apparatus can be constructed in a relatively small size.

U.S. Pat. No. 5,534,710 describes the use of a radiation image storage panel comprising a stimulable phosphor layer and an erasing light-diffusion preventive layer capable of allowing transmission of stimulated emission while preventing an erasing light impinged thereupon from diffusing within the preventive layer along the plane thereof in the radiation image reading system employing the double-side reading system which comprises the steps of exciting an area of the phosphor layer of the radiation image storage panel which has a radiation energy therein in the form of a latent image with stimulating rays to release the radiation energy from the phosphor layer as stimulated emission and simultaneously detecting photoelectrically the stimulated emission from both sides of the storage panel to obtain electric signals for reproduction of a radiation image; and applying an erasing light on the same area of the radiation image storage panel after completion of the above exciting and detecting step in parallel with a successive exciting and detecting step applied simultaneously on other area of the storage panel. The U.S. patent further describes that the erasing light-diffusion preventive layer of the above radiation image storage panel may be in the form of a colored layer capable of absorbing the erasing light, a layer diffuses the erasing light on the interface between said preventive layer and the stimulable phosphor layer, or an optical path-limiting layer capable of accepting only a light impinged thereupon at an incident angle of 30° or more and guiding the accepted light to pass therethrough vertically.

SUMMARY OF THE INVENTION

The radiation image storage panel described in U.S. Pat. No. 5,534,710 is effective to prevent troublesome transmission of the erasing light within the storage panel to reach the area under stimulation.

According to further study performed by the present inventor, however, it has been discovered that the radiation image storage panel shows certain decrease of erasing efficiency because entrance of erasing light into the phosphor layer is somewhat disturbed by the provision of the erasing light-diffusion preventive layer to the stimulable phosphor layer. If the erasing efficiency decreases, it is required to prolong the period of the erasing procedure.

Accordingly, it is an object of the present invention to provide a radiation image reading system employing the combined reading and erasing steps but being free from reproducing the noisy radiation image and also showing a high erasing efficiency.

The present invention resides in a radiation image storage panel comprising a support sheet and a stimulable phosphor layer provided thereon, wherein the support sheet shows a light transmittance of not less than 70% in the wavelength region between 400 nm and 800 nm and a haze of 10 to 30.

The invention further resides in a radiation image reading method comprising the steps of:

exciting an area of the phosphor layer of a radiation image storage panel which has a radiation energy therein in the form of a latent image with stimulating rays to release the radiation energy from the phosphor layer as stimulated emission and simultaneously detecting photoelectrically the stimulated emission from both sides of the storage panel to obtain electric signals for reproducing a radiation image, said radiation image storage panel comprising a support sheet which shows a light transmittance of not less than 70% in the wavelength region between 400 nm and 800 nm and a haze of 10 to 30, and a stimulable phosphor layer provided thereon; and, applying an erasing light on the same area of the radiation image storage panel after completion of the above exciting and detecting step in parallel with a successive exciting and detecting step applied simultaneously on other area of the storage panel.

BRIEF DESCRIPTION OF THE DRAWINGS

FIG. 2 shows a schematic view of a radiation image storage panel of the invention.

FIG. 3 shows a schematic view of an apparatus employed for evaluating the radiation image storage panels with respect to transmission of the erasing light within the storage panels along their planes.

FIG. 4 shows a relationship between haze and transmission of the erasing light within the storage panels along their planes for radiation image storage panels of Examples and Comparison Examples.

DETAILED DESCRIPTION OF THE INVENTION

Figure 1:
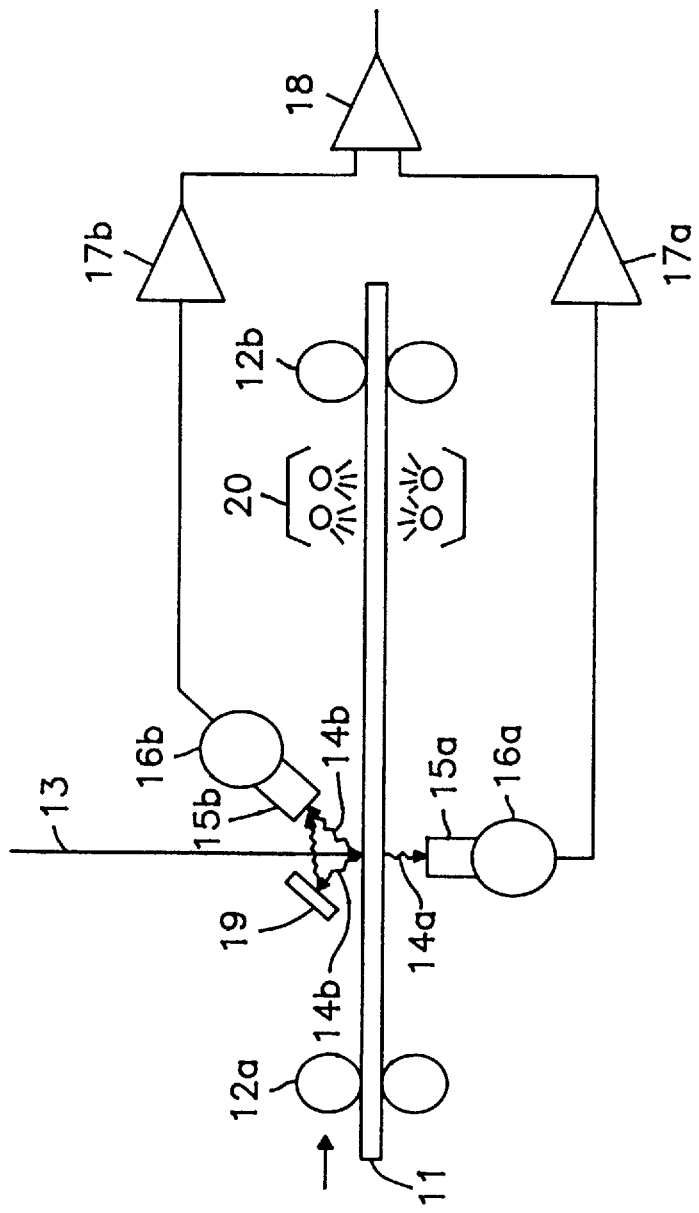
FIG. 1 shows a schematic view of a radiation image reading system which comprises reading from both sides, namely, double-side reading system.

The representative structure of the radiation image storage panels according to the invention is described below by referring to FIG. 2 illustrated in the attached drawings.

FIG. 2 shows a radiation image storage panel having a stimulable phosphor layer 21 and a support sheet 22 which shows a haze in the specified range, while through which the erasing light is well transmitted. On the surface of the phosphor layer 21 is arranged a transparent protective layer 23.

The radiation image storage panel of the invention comprises a stimulable phosphor layer and a support sheet which is highly transparent but has a haze in the specific range. The stimulable phosphor layer comprising a stimulable phosphor can be generally prepared in the form of an independent stimulable phosphor sheet by coating a coating dispersion of the stimulable phosphor in a binder solution on a temporary support such as a glass plate or a plastic sheet, drying, and peeling the dry coated layer off the temporary support.

The stimulable phosphor gives a stimulated emission when it is irradiated with stimulating rays after it is exposed to radiation. In the preferred radiation image storage panel, a stimulable phosphor giving a stimulated emission of a wavelength in the range of 300 to 500 nm when it is irradiated with stimulating rays of a wavelength in the range of 400 to 900 nm is employed. Examples of the preferred stimulable phosphors include divalent europium activated alkaline earth metal halide phosphors and a cerium activated alkaline earth metal halide phosphors. Both stimulable phosphors favorably give the stimulated emission of high luminance. However, the stimulable phosphors employable in the radiation image storage panel of the invention are not limited to the above-mentioned preferred stimulable phosphors.

The stimulable phosphor sheet also can be prepared using no binder polymer. For instance, the stimulable phosphor sheet can be formed of aggregated phosphor particles which may be impregnated with a polymer. Otherwise, the stimulable phosphor layer can be formed on a support sheet by vacuum deposition.

The stimulable phosphor sheet or layer is then combined with the specific support sheet, for instance, using an adhesive.

Otherwise, the stimulable phosphor layer can be directly formed on the support sheet having the specified optical characteristics. On the surface of the phosphor layer opposite to the surface to face the support sheet may be provided a transparent protective layer (which may be in the form of an independent film or a coated layer).

According to the present invention, the support sheet on which the stimulable phosphor sheet is required to have the specific optical characteristics, that is, a light transmission (namely, total light transmittance) of not less than 70% in the wavelength region between 400 nm and 800 nm and a haze of 10 to 30. The support sheet having such specific optical characteristics can be prepared by subjecting a temperature polymer film to treatment for forming matted surface on the film. A preferred treatment is sand-blast treatment. Examples of the transparent polymer films include films of polyethylene terephthalate, polyethylene naphthalate, polyimide, polycarbonate, polyolefins such as polyethylene, polyamide, and polyvinylidene chloride.

The support sheet having the specific optical characteristics also can be produced by adjusting the conditions for preparing a polymer films, for instance, adjusting conditions of extending procedure or employing an appropriately adjusted polymer mixture.

The support sheet generally has a thickness in the range of 50 to 2,000 μm, preferably 100 to 1,000 μm.

The radiation image storage panel is generally employed repeatedly in cycle. Accordingly, the stimulable phosphor layer preferably has a transparent protective layer of a thickness of less than 30 μm on its surface other than the surface facing the support or the light diffusing-preventive layer. The protective layer can be made of cellulose acetate, nitrocellulose, polymethyl methacrylate, polyvinyl butyral, polyvinyl formal, polycarbonate, polyvinyl acetate, vinyl chloride-vinyl acetate copolymer, or fluororesin. The protective layer is preferably made of a fluororesin (namely, a fluorine atom-containing resin). Also employable for preparation of the protective layer is polyethylene terephthalate, polyethylene naphthalate, polyimide, polyethylene, vinylidene chloride, or polyamide. The protective layer can be prepared directly on the phosphor layer using a coating solution. Also employable is a beforehand prepared transparent plastic film.

Examples embodying the present invention are given below.

EXAMPLE 1

To methyl ethyl ketone were added 200 g of divalent europium activated barium fluorobromide (BaFBr:Eu$^{2+}$) stimulable phosphor particles, 40 g of a solution of a polyurethane resin (Pandex T-5265M, product of Dai-Nippon Ink Chemical Industries, Co., Ltd.) in methyl ethyl ketone (20 weight % concentration), and 2 g of Bisphenol A type epoxy resin. The resulting mixture were stirred using a propeller mixer to give a dispersion containing the binder and phosphor particles in the ratio of 1:20 (weight ratio).

The obtained dispersion was uniformly coated over a polyethylene terephthalate sheet (temporary support having a releasing layer, thickness: 250 μm) which was fixed on a glass plate with an adhesive. The coated sheet together with the glass plate was placed in an oven and heated generally from 25° C. to 100° C. to dry the coated layer. Thus, a stimulable phosphor layer having a thickness of 220 μm was formed on the temporary support. The phosphor layer was then separated from the support to give a stimulable phosphor sheet.

Separately, one surface of a transparent polyethylene terephthalate film (thickness: 250 μm) was subjected to sand-blast treatment to give a matted surface. It was determined that thus treated film had a haze of 11 and a light transmittance of 81% in the wavelength region between 400 nm and 800 nm.

A solution of a soft acrylic resin (20% methyl ethyl ketone solution) was then coated on another surface of the polyethylene terephthalate film and dried to form an adhesive layer.

On the adhesive layer of the polyethylene terephthalate film was fixed the stimulable phosphor sheet. On the fixed phosphor layer was then fixed a transparent polyethylene terephthalate film (protective film, thickness: 10 μm) using an adhesive. There was obtained a radiation image storage panel of the invention having the structure of FIG. 2.

EXAMPLE 2

The procedures of Example 1 were repeated except for employing a polyethylene terephthalate film (thickness: 250 μm) which was before hand matted to have a haze of 20 and a transmittance of 78%, to obtain a radiation image storage panel of the invention.

EXAMPLE 3

The procedure of Example 1 were repeated except for employing a polyethylene terephthalate film (thickness: 250 μm) which was beforehand matted to have a haze of 28 and a transmittance of 72%, to obtain a radiation image storage panel of the invention.

COMPARISON EXAMPLE 1

To 100 g of methyl ethyl ketone were added 0.3 g of a silicon powder (mean particle diameter: 1 µm) and 50 g of a solution of a soft acrylic resin (20% methyl ethyl ketone solution) to prepare a coating solution. The coating solution was then coated on one surface of a transparent polyethylene terephthalate film (thickness: 250 µm) using a doctor blade and dried to form a white filler-containing layer (inner diffusion layer) of 10 µm thick. On another side surface of the polyethylene terephthalate film was coated using a doctor blade a solution prepared by mixing 0.3 g of a ultramarine blue (mean particle diameter: 0.8 µm), 30 g of a fluororesin solution (40% solution of fluoroolefin-vinyl ether copolymer), 5 g of an isocyanate-type crosslinking agent solution (70% solution) and 100 g of methyl ethyl ketone. The coated layer was dried to form a blue-colored outer layer of 10 µm thick. Thus prepared support film had a haze of 8 and a light transmittance of 73%.

On the inner diffusion layer of the above-obtained polyethylene terephthalate film was fixed the stimulable phosphor sheet of Example 1 using an adhesive. On the fixed phosphor layer was then fixed a transparent polyethylene terephthalate film (thickness: 11 µm) using an adhesive. Thus, a radiation image storage panel for comparison was prepared.

COMPARISON EXAMPLE 2

The procedure of Example 1 were repeated except for employing a non-transparent opaque polyethylene terephthalate film (thickness: 250 µm) which had a haze of 78 and a light transmittance of 23%, to obtain a radiation image storage panel for comparison.

COMPARISON EXAMPLE 3

The procedures of Example 1 were repeated except for employing a non-transparent polyethylene terephthalate film (thickness: 250 µm) which had a haze of 40 and a light transmittance of 50%, to obtain a radiation image storage panel for comparison.

COMPARISON EXAMPLE 4

The procedures of Example 1 were repeated except for employing a polyethylene terephthalate film (thickness: 250 µm) which was beforehand matted to have a haze of 72 and a light transmittance of 74%, to obtain a radiation image storage panel for comparison.

COMPARISON EXAMPLE 5

The procedures of Example 1 were repeated except for employing a polyethylene terephthalate film (thickness: 250 µm) which was beforehand matted to have a haze of 65 and a light transmittance of 70%, to obtain a radiation image storage panel for comparison.

[Evaluation on Transmission of Erasing Light in Radiation Image Storage Panel on its Plane]

The evaluation was performed using an apparatus illustrated in FIG. 3. An erasing light radiated from a sodium lamp 32 was passed through slit 33 and irradiated on the support at an area adjacent to one end of a radiation image storage panel 31. The erasing light transferred through the support was detected at the position of L mm distance away on the same plane, using a photodiode 34 (effective diameter: 8 mm). The results are indicated in terms of a light leakage ratio which is the ratio of an intensity of the detected erasing light transmitted per an intensity of the applied erasing light, and described as follows:

[Intensity of the erasing light detected by photodiode: mW]/[Intensity of the applied erasing light: mW]

The resulting relationship between a haze and a light leakage ratio is graphically illustrated in FIG. 4. The results illustrated in FIG. 4 indicate that a preferred light leakage ratio (not higher than $10^{-7}$) is obtained in the case that a support sheet of a radiation image storage panel has a haze of not lower than 10.

[Evaluation of Erasing Efficiency of Radiation Image Storage Panel]

The radiation image storage panel was irradiated on its protective layer with X-rays at a tube voltage of 80 KVp, and subsequently scanned with stimulating rays (He-Ne laser beam: 632.8 nm) to release stimulated emission. The stimulated emission light was detected and converted into an electric current value ($I_1$) corresponding to the amount of stimulated emission light.

Figure 5:
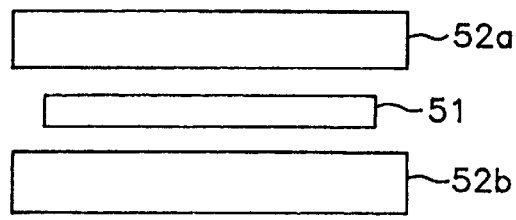
FIG. 5 shows a schematic view of an apparatus employed for evaluating the radiation image storage panels with respect to their erasing efficiency.

Subsequently, the radiation image storage panel 51 was placed in an erasing unit illustrated in FIG. 5, and irradiated with a white luminescence light (total amount of irradiating light: 1,000,000 Lx·sec) applied from a set of white luminescence lamps 52a, 52b. Thus treated radiation image storage panel was scanned with stimulating rays (He-Ne laser beam: 632.8 nm) to release stimulated emission. The stimulated emission light was detected and converted into an electric current value ($I_2$) corresponding to the amount of stimulated emission light.

For each radiation image storage panel, a non-erasure ratio in terms of $I_2/I_1$ was obtained. A smaller non-erasure ratio means a higher erasing efficiency.

Figure 6:
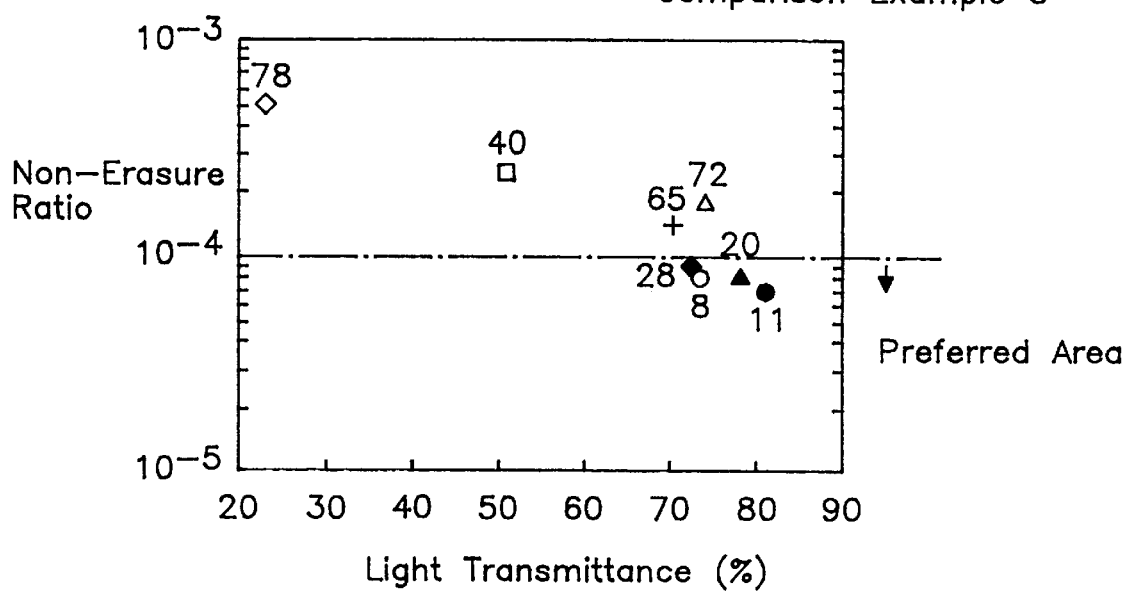
FIG. 6 shows a relationship between a light transmission and an erasing efficiency with respect to radiation image storage panels of Examples and Comparison Examples.

The non-erasure ratio obtained for each radiation image storage panel is illustrated in FIG. 6. The results indicate that a preferred non-erasure ratio (not higher than $10^{-4}$) is obtainable if the support sheet shows a high light transmittance such as not less than 70% and a haze of not more than 30.

[Evaluation of Radiation Image Storage Panel in Radiation Image Recording and Reproducing Method]

The radiation image storage panels of Examples 1 to 3 which showed a light transmittance of not less than 70% and a haze of 10 to 30 were examined in their erasing efficiency by employing them in actual radiation image recording and reproducing procedures according to the double-side reading system. The reading and erasing were performed on both sides in parallel using the apparatus illustrated in FIG. 1.

It was confirmed that the radiation image storage panels of Examples 1 to 3 give a high erasing efficiency with no adverse influence to quality of reproduced radiation image. Therefore, it is apparent that the use of a radiation image storage panel of the invention is advantageous in performing a radiation image recording and reproducing method according to the double-side reading system, because it gives good radiation image reproduction without no substantial prolongation of the erasing period.

What is claimed is:

1. A radiation image storage panel comprising a support sheet having a thickness in the range of 100 to 1,000 μm, a stimulable phosphor layer provided thereon, and a transparent protective layer having a thickness of less than 30 μm, wherein the support sheet shows a light transmittance of not less than 70% in the wavelength region between 400 nm and 800 nm and a haze of 10 to 30.

2. The radiation image storage panel of claim 1, wherein the support sheets shows a transmittance of 70 to 85%.

3. The radiation image storage panel of claim 1, wherein the support sheet is produced by subjecting a transparent polymer sheet to sand-blasting so as to form a matted surface thereon.

4. The radiation image storage panel of claim 1, wherein the support sheet has a matted surface.

5. A radiation image reading method comprising the steps of:

an exciting and detecting step which comprises exciting an area of a phosphor layer of a radiation image storage panel which has radiation energy therein in the form of a latent image with stimulating rays to release the radiation energy from the phosphor layer as stimulated emission and simultaneously detecting photoelectrically the stimulated emission from both sides of the storage panel to obtain electric signals for reproducing a radiation image, said radiation image storage panel comprising a support sheet having a thickness in the range of 100 to 1,000 μm and which shows a light transmittance of not less than 70% in the wavelength region between 400 nm and 800 nm and a haze of 10 to 30, a stimulable phosphor layer provided thereon, and a transparent protective layer having a thickness of less than 30 μm; and an erasing step which comprises applying an erasing light on said area of said phosphor layer of said radiation image storage panel after completion of said exciting and detecting step in parallel with a successive exciting and detecting step applied simultaneously on another area of the storage panel.

* * * * *